July 22, 1941.  A. H. BEEN  2,250,347
ANIMAL TRAP
Filed Nov. 7, 1940  3 Sheets-Sheet 1

Inventor
Amos H. Been
By
Attorney

July 22, 1941. A. H. BEEN 2,250,347
ANIMAL TRAP
Filed Nov. 7, 1940 3 Sheets-Sheet 2
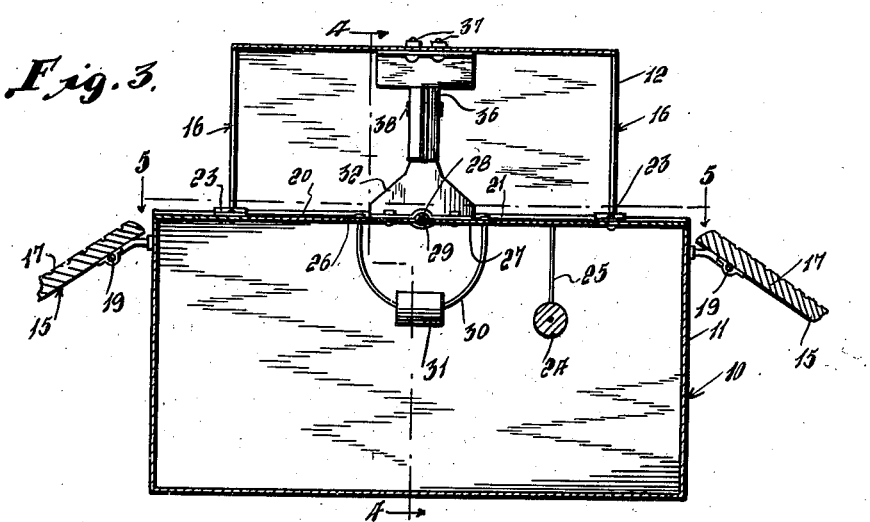
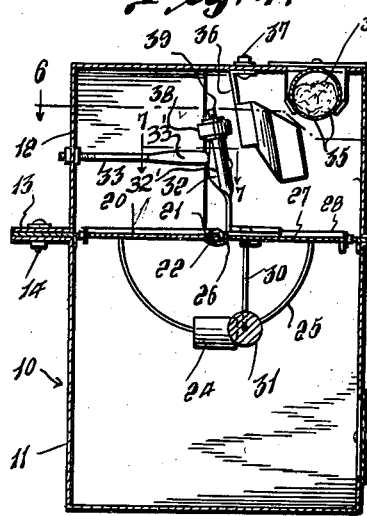
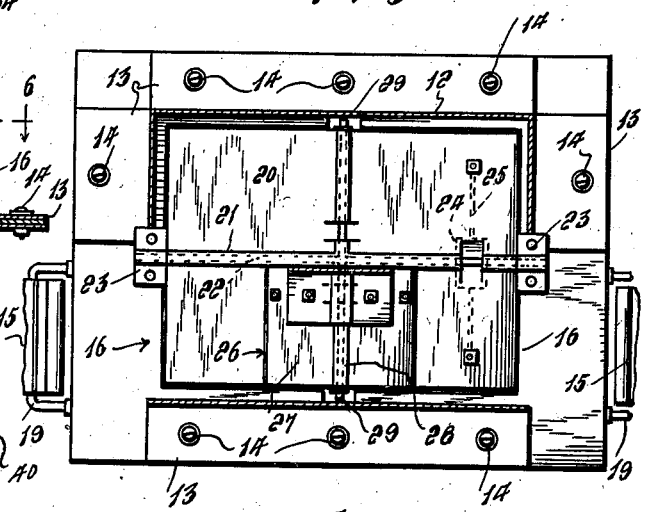
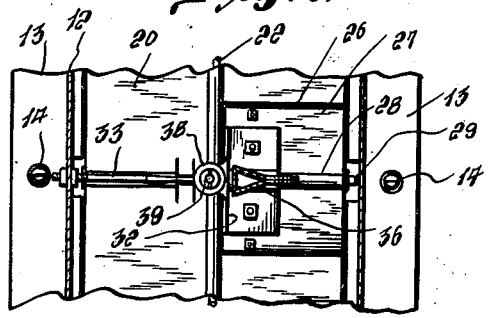
Inventor
Amos H. Been
By L. F. Randolph
Attorney July 22, 1941.     A. H. BEEN     2,250,347
ANIMAL TRAP
Filed Nov. 7, 1940     3 Sheets-Sheet 3
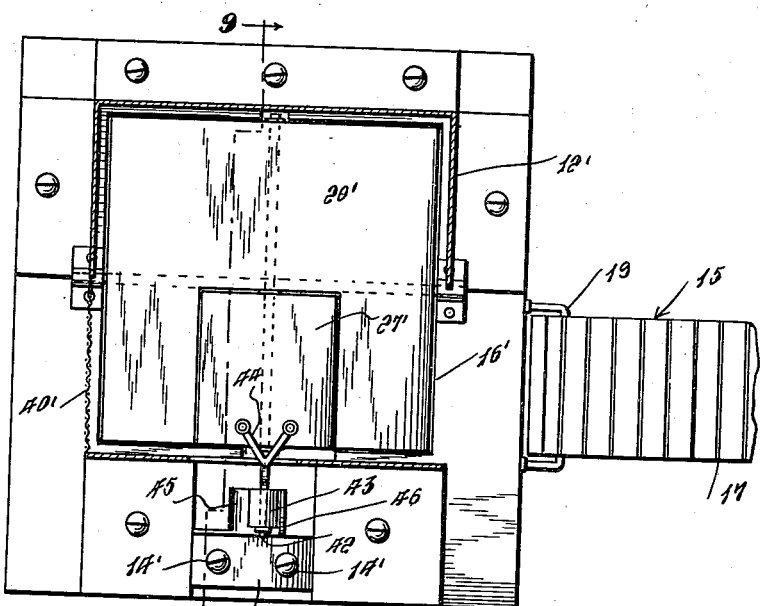
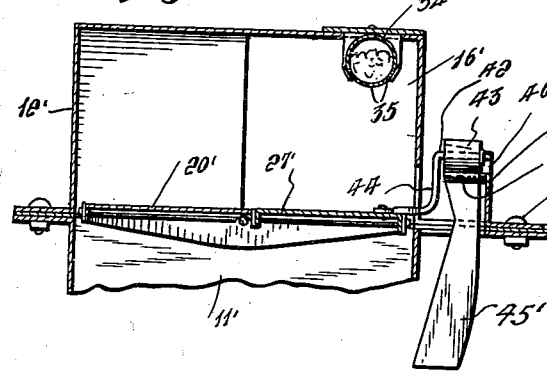
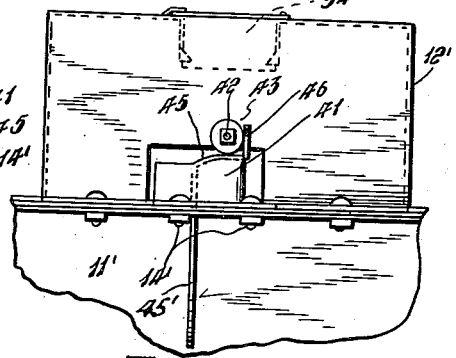
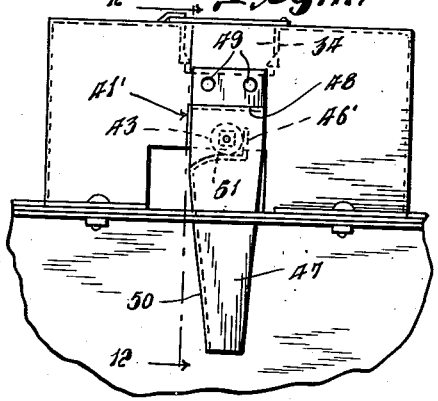
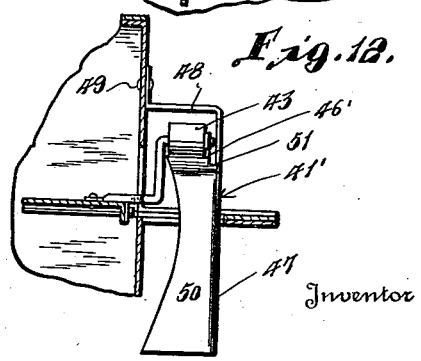
Inventor
Amos H. Been
By L. F. Randolph
Attorney Patented July 22, 1941

2,250,347

UNITED STATES PATENT OFFICE 2,250,347

ANIMAL TRAP

Amos H. Been, Henryetta, Okla.

Application November 7, 1940, Serial No. 364,737

6 Claims. (Cl. 43—70)

This invention relates to an animal trap particularly of the type called "colony traps" for catching one or more animals alive without re-baiting or resetting, and particularly rats, mice, and other rodents.

It is particularly aimed to provide a novel construction having a trip platform in relatively movable sections, one of which is adapted to be maintained against tripping until the animal treads upon the other and thereby trips both of them, and to provide the particular constructions, preferably weight controlled, and operable through entry of an animal from either or opposite directions, all as will be more specifically hereinafter described and illustrated in accompanying drawings.

In said drawings:

Figure 3 is a substantially central transverse vertical sectional view;

Figure 4 is a vertical section taken on the plane of line 4—4 of Figure 3;

Figure 5 is a horizontal section taken on the plane of line 5—5 of Figure 3;

Figure 6 is a horizontal section taken on the plane of line 6—6 of Figure 4;

Figure 7 is a detail section taken on the line 7—7 of Figure 4;

Figure 8 is a horizontal section taken through a modified form of construction;

Figure 9 is a vertical section taken on the plane of line 9—9 of Figure 8;

Figure 10 is a fragmentary end elevation of the structure of Figure 8;

Figure 11 is a fragmentary end elevation of a further modified form, and

Figure 12 is a vertical section taken on the line 12—12 of Figure 11.

Figure 1:
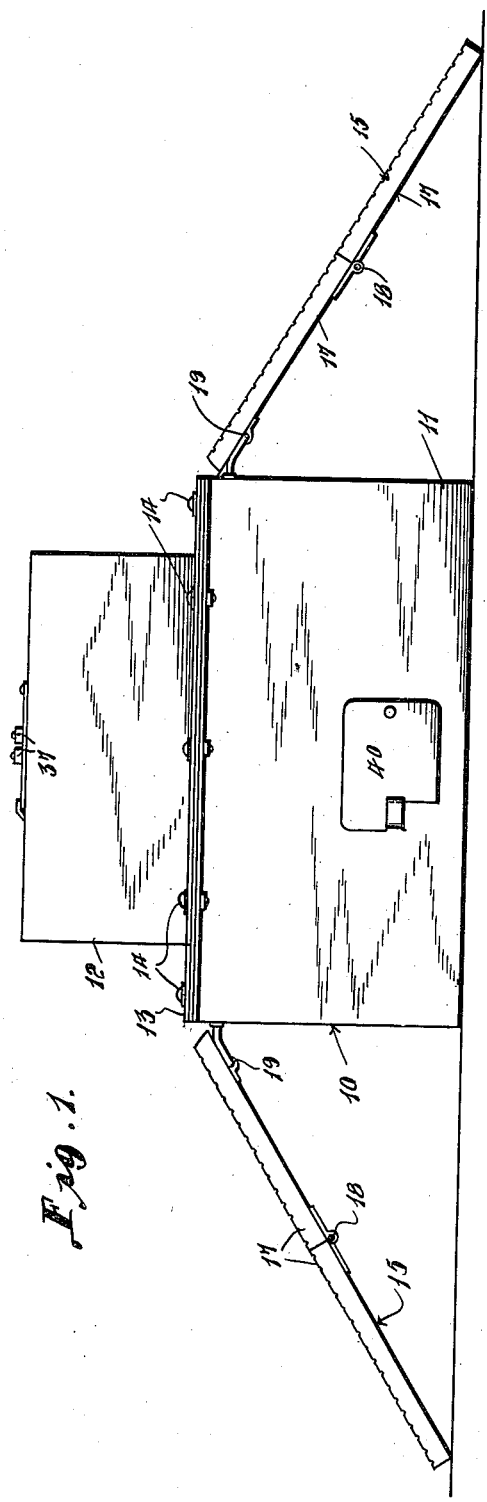
Figure 1 is a view in side elevation of the improved trap.
Figure 2:
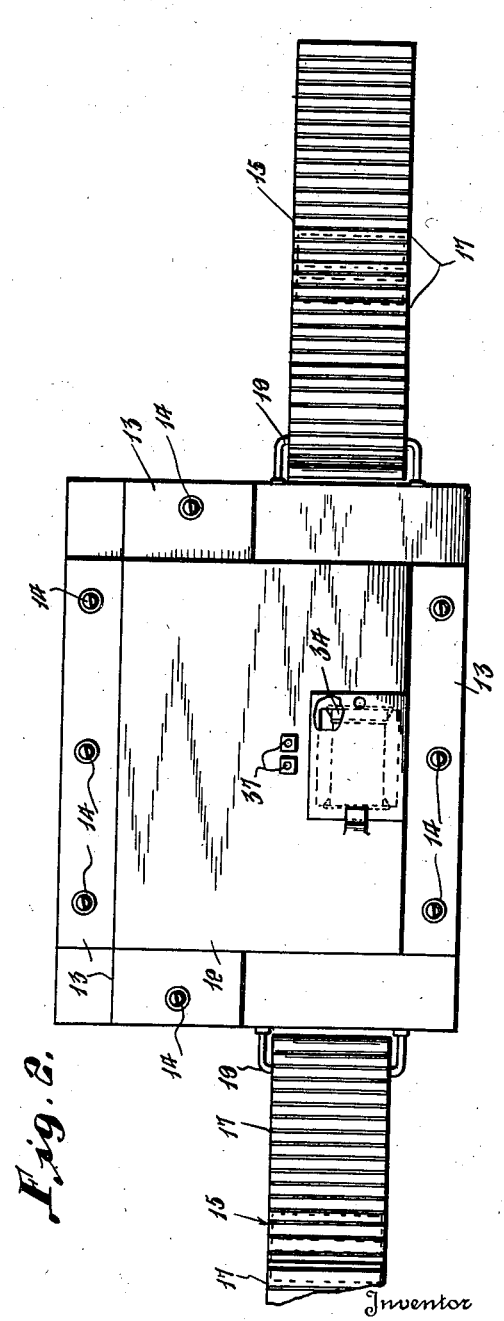
Figure 2 is a plan view thereof.

Referring specifically to the drawings wherein like reference characters designate like or similar parts, a suitable housing or casing is provided as at 10 and preferably consisting of a main or cage section 11 and a dome or entrance section 12 disposed thereon, the sections at their junction preferably being outwardly flanged as at 13 and detachably bolted together as at 14.

The rodents or animals are adapted to ascend steps or ladders at 15, walk across the flanges 13 and enter the section 12 through openings 16 in end walls of the dome section 12. Said ladders 15 may be of any suitable construction but they are preferably provided in sections 17, hinged together at 18 and hinged at 19 to the casing section 11, so that they may be folded against each other and relatively close to the casing section 11 to occupy minimum space when not in use.

At the junction plane of the sections 11 and 12 is a main trip platform 20 having a barrel 21, pivotally mounting it on a longitudinally extending rod 22 fastened in brackets 23 mounted on the casing section 11. Such main trip platform 20 is normally maintained in and urged to a horizontal position by a counterweight 24 carried by an arcuate wire 25 suspended from the platform 20.

Said platform 20 is cut away to provide a rectangular recess 26, in which is located an auxiliary trip platform 27. This auxiliary trip platform has a barrel 28 disposed transversely thereof and at right angles to the barrel 21 whereby it is pivotally mounted on a rod 29 suitably secured to the main trip platform 20. An arm 30 depends from the platform 27 carrying a weight 31, which normally maintains the auxiliary trip platform 27 in horizontal position and urges it to that position, in which position, an upstanding arm 32 is in contact with a forwardly extending abutment 33 fastened to a wall of the dome section 12. Said abutment is widened toward the center of the hood at 33' and coacts with a cam portion 32' on arm 32. Because of this abutment, the main trip platform 20 can only move downwardly below the horizontal at that portion in line with the openings 16 under the weight of an animal or rodent. Any suitable bait may be carried in a container 34 suitably supported within the casing section 12 and which container is preferably perforated as at 35, so that the odor will better attract the rodent. Adjacent the bait receptacle 34, another abutment member 36 is suspended from the top wall of section 12 as by means of bolts 37. Relatively close to the abutment 36 when the trip platforms 20 and 27 are in normal horizontal positions, is a roller 38 which is adapted to travel along such abutment 36, the roller being journaled on a projection 39 at the upper end of the arm 32.

As a result of the construction described, a rodent entering the hood section 12 through either opening 16, will first tread upon the platform 20 which will remain relatively stationary because it cannot tilt due to the contact of roller 38 with the abutment 36, and cannot tilt in the other direction due to the abutment of arm 32 with abutment 33. However, when the rodent advances into the section 12 for a short distance, it treads upon the trip platform 21 thereby rocking the latter on its pivot 29, and moving the roller 38 along the abutment 36 and past it, whereupon platform 20 is free to move downwardly at the portion beneath the bait receptacle, whereby the rodent will fall into the cage receptacle or section 11 and be trapped since the platforms 20 and 27 rapidly return to normal horizontal positions due to the action of the weights at 24 and 31, thus being self-setting. The bait, it will be realized, is never reached by the rodent. The trap will successively catch any desired number of the rodents, up to its capacity, without rebaiting or resetting. Trapped rodents, may be removed for destruction through an opening covered by a conventional door 40 provided in one side wall of section 11.

Various changes may be resorted to provided they fall within the spirit and scope of the invention.

For instance, I may resort to the form shown in Figures 8, 9 and 10. In this form, the main trip platform and auxiliary trip platform are shown at 20' and 27', being pivotally mounted and weighted so as to operate identically with the parts 20 and 27, respectively, of the preceding form. In this instance, the dome or upper section 12', equivalent to that at 12, has but one entrance opening for the rodent at 16', and the wall opposite thereto in line therewith is preferably closed by a metallic screen as at 40'. In this form, a suitable bracket 41 is provided outside of the section 12' and is preferably secured in place by one or more of the bolts 14', equivalent to those at 14. The cage section in this form is designated 11' and functions like that at 11. A short shaft 42 having a roller 43 thereon, is bifurcated to provide tangs 44 which are fastened to the auxiliary trip platform 27'. Roller 43 normally rests on a track portion 45 of the bracket 41, abutting an upstanding lug 46 thereon. An arm 45' on bracket 41, keeps the roller 43 on the track. The weighting of the auxiliary trip platform 27' in the same manner as that at 27, normally urges the same to horizontal position and the roller to the position shown in Figures 9 and 10. When a rodent enters the opening 16', he treads on the main trip platform 20' but the latter will not tilt because the roller 43 is in engagement with track 45. However, when the rodent advances and treads upon the auxiliary trip platform 27' beyond its axis, the latter will tilt, moving the roller 43 along and off of the track 45 whereupon the auxiliary trip platform 27' will swing at an angle to the platform 20', thus causing the animal of its weight to lower with the platforms and finally pass through the opening occupied by the platform 27' into the cage section 11', after which, the platforms will be automatically reset or moved to horizontal positions under action of their weights.

In the further modified form of Figures 11 and 12, a modified form of bracket is used in place of that at 41 and is designated 41', preferably being made from sheet metal and formed in a single piece. It coacts with the roller 43, in the same manner as the bracket 41 in the preceding form. This bracket 41' has a vertical side wall 47 which extends upwardly and thence inwardly at 48 over the roller 43 and is riveted as at 49 to the section 12. A flange 50 is bent inwardly at a right angle to the wall 47 and the upper portion thereof is shaped as at 51 into a track functioning like that at 45 and terminating in an abutment 46' functioning like that at 46.

I claim as my invention:

1. A trap comprising a casing, a trip platform pivoted to the casing at the entrance thereto, an auxiliary trip platform pivoted to and carried by the first mentioned trip platform, means urging said trip platforms to casing-closing positions, the pivotal axes of said trip platforms being at different angles, abutment means holding the platforms against tripping, releasable to cause tripping under the weight of an animal treading upon the auxiliary trip platform, said abutment means comprising an arm on the auxiliary trip platform and an abutment member on the casing engageable by the arm.

2. A trap comprising a casing, a trip platform pivoted to the casing at the entrance thereto, an auxiliary trip platform pivoted to and carried by the first mentioned trip platform, means urging said trip platforms to casing-closing positions, the pivotal axes of said trip platforms being at different angles, abutment means holding the platforms against tripping, releasable to cause tripping under the weight of an animal treading upon the auxiliary trip platform, said abutment means comprising an arm on the auxiliary trip platform and an abutment member on the casing engageable by the arm, and a roller on the arm to directly engage the abutment member.

3. A trap comprising a casing, a trip platform pivoted to the casing at the entrance thereto, an auxiliary trip platform pivoted to the first mentioned trip platform, means urging said trip platforms to casing-closing positions, the pivotal axes of said trip platforms being at different angles, abutment means holding the platforms against tripping, releasable to cause tripping under the weight of an animal upon treading of the animal upon the auxiliary trip platform, comprising an arm rising from the auxiliary trip platform, and abutment members on the casing with which the arm coacts arranged on opposite sides of the arm.

4. A trap comprising a casing, a trip platform pivoted to the casing at the entrance thereto, an auxiliary trip platform pivoted to the first mentioned trip platform, means urging said trip platforms to casing-closing positions, the pivotal axes of said trip platforms being at different angles, abutment means holding the platforms against tripping, releasable to cause tripping under the weight of an animal upon treading of the animal upon the auxiliary trip platform, comprising a projection on the auxiliary platform, a bracket having a track engageable and disengageable by the projection, and an abutment for the projection on the track.

5. A trap comprising a casing, a trip platform pivoted to the casing at the entrance thereto, an auxiliary trip platform pivoted to the first mentioned trip platform, means urging said trip platforms to casing-closing positions, the pivotal axes of said trip platforms being at different angles, abutment means holding the platforms against tripping, releasable to cause tripping under the weight of an animal upon treading of the animal upon the auxiliary trip platform, comprising a bracket fastened to the casing, a flange on the bracket having its upper portion forming a track and a stop, and a projection on the auxiliary platform engageable and disengageable with the track and stop.

6. A trap comprising a casing, a trip platform pivoted to the casing at the entrance thereto, an auxiliary trip platform pivoted to the first mentioned trip platform, means urging said trip platforms to casing-closing positions, the pivotal axes of said trip platforms being at different angles, abutment means holding the platforms against tripping, releasable to cause tripping under the weight of an animal upon treading of the animal upon the auxiliary trip platform, comprising a projection on the auxiliary platform, a bracket having a track engageable and disengageable by the projection, an abutment for the projection on the track, said bracket being disposed exteriorly of the casing, and said projection extending through a wall of the casing.

AMOS H. BEEN.